United States Patent [19]
Packard et al.

[11] 3,757,250
[45] Sept. 4, 1973

[54] ELECTRON BEAM LASER

[75] Inventors: James R. Packard; Donald A. Campbell, both of St. Paul; William C. Tait, Oak Park Heights; Gunther H. Dierssen, White Bear Lake, all of Minn.

[73] Assignee: Minnesota Mining and Manufacturing Company, St. Paul, Minn.

[22] Filed: June 1, 1970

[21] Appl. No.: 42,437

Related U.S. Application Data

[63] Continuation-in-part of Ser. No. 599,576, Dec. 6, 1966, abandoned, and a continuation-in-part of Ser. No. 32,330, April 27, 1970, abandoned.

[52] U.S. Cl. .............................. 331/94.5, 250/199
[51] Int. Cl. ........................... H01s 3/09, H01s 3/18
[58] Field of Search.................. 331/94.5; 350/160, 350/161; 250/199

[56] References Cited
UNITED STATES PATENTS

| 3,393,373 | 7/1968 | Stimler | 331/94.5 |
| 3,575,627 | 4/1971 | Nicoll | 331/94.5 X |

OTHER PUBLICATIONS

Hurwitz, Applied Physics Letters, 8, p 243–5, May 15, 1966.

Hurwitz, Applied Physics Letters, 8, (5), pp 121–4, March 1, 1966.

Basov, "Semiconductor Lasers," Science, 149, (3686), 18 Aug. 65 pp. 821–7

Basov, In Physics of Quangom Elecronic Conf. Proc. San Juan, Pub. date Jan 26, 1966, pp 411, 420–423.

Lax, Solid State Design, 6, March 1965, pp 19–23.

*Primary Examiner*—Ronald L. Wibert
*Assistant Examiner*—R. J. Webster
*Attorney*—Kinney, Alexander, Sell, Steldt & Delahunt

[57] ABSTRACT

A longitudinal-direction laser. The laser device comprises a source of electrons and a light resonant cavity which includes a direct band-gap semiconductor crystal having a pair of spaced, opposing, smooth faces. When a beam of electrons of at least a predetermined energy and current density is impinged upon one of the crystal faces, laser emission produced within an active region of the crystal is emitted from at least one of the crystal faces in a direction generally longitudinal to the direction of the beam of electrons. When laser emission is produced, the active region depth is less than the crystal thickness in the direction normal to the opposing faces.

12 Claims, 7 Drawing Figures

PATENTED SEP 4 1973

3,757,250

INVENTORS
JAMES R. PACKARD
DONALD A. CAMPBELL
WILLIAM C. TAIT
GUNTHER H. DIERSSEN
BY Kinney, Alexander,
Sell, Steldt & DeLaHunt
ATTORNEYS

ELECTRON BEAM LASER

CROSS REFERENCES

This application is a continuation-in-part of our pending application, Electron Beam Laser, U.S. Ser. No. 599,576, filed Dec. 6, 1966, now abandoned and of our application of the same title Ser. No. 32,330, filed Apr. 27, 1970 now abandoned.

BACKGROUND OF THE INVENTION

This invention relates in general to electron beam pumped lasers of the type wherein a direct band-gap semiconductor having a pair of spaced, opposing parallel faces is bombarded with a beam of electrons.

It is known to bombard a large surface of a laser crystal, either a platelet or a wafer cut from a bulk crystal, to produce electromagnetic radiation from an edge of the crystal in a direction transverse to the direction of the bombarding beam. Such laser apparatus are described in U.S. Pat. No. 3,505,613 and in co-pending application U.S. Ser. No. 588,906 filed Oct. 24, 1966, now abandoned but continued by Ser. No. 124,949 filed 3-16-71 both of which are assigned to the same assignee as the present application. In such "transverse-direction" lasers, the parallel faces of the laser light-resonant cavity are conveniently cleavage planes of the semiconductor. By cleaving a crystal along two cleavage planes, the crystal is provided with two edges which in a perfect crystal are perfectly parallel. When the large crystal surface between these edges is bombarded with an electron beam, electromagnetic radiation thereby produced within the crystal is emitted from the crystal through one or both parallel edges.

The direct band-gap semiconductor materials of such transverse-direction lasers provide laser emission at a number of different wavelengths, which permits close matching of the laser emission to the sensitivity of light-sensitive media operated on by the laser emission e.g., photographic films and optical detectors such as photo diodes). It is also relatively easy to fabricate the cavity of a transverse-direction laser. The laser emission from transverse-direction lasers, however, is scannable in only one dimension.

The advantages of a two-dimensionally scannable laser, have been recognized. In "Scanatron — a Scanning Beam Semiconductor Laser," B. Lax, Solid State Design, Vol. 6, pages 19 – 23, March 1965, the author recognized the increased effectiveness and versatility which a two-dimensionally scannable laser would have as compared to a laser scannable in only one dimension. Two predictions as to how such a laser might be constructed were ventured. The first comprised a plurality of transverse-direction lasers stacked in a staircase arrangement to provide one scanning dimension up and down the staircase and another scanning dimension across the staircase. For the second, the author hypothesized that a crystal (sheet) polished so that its large surfaces were parallel and only 5 to 10 microns apart and bombarded on one of its large surfaces with an electron beam having a diameter 100 microns or less, might produce laser emission in a direction parallel to the bombarding beam, i.e., in a longitudinal direction. Movement of the impinging beam along the two dimensions of the large surface of such a "longitudinal-direction" laser would then produce a two-dimensional scanning of the laser emission emitted from the crystal.

It will be appreciated that a crystal 10 microns or less thick would be very fragile. It therefore would be necessary to carefully control the steps for polishing a crystal to such a thinness. And, once polished to be so very thin, it would be necessary to handle a crystal delicately to avoid damaging it.

Further, it will be appreciated that the cross-section of the laser emission as it is emitted from the crystal of the above-described longitudinal-direction laser would ordinarily be less than 100 microns. Although in certain applications it is desired that the laser emission have a diameter of 100 microns or less, in a number of two-dimensionally scannable laser devices, e.g., color television and surgical knife laser devices, it is desirable that the cross-section of the laser emission have at least one dimension greater than 100 microns.

SUMMARY OF THE INVENTION

According to the present invention we have succeeded in constructing a two-dimensionally scannable longitudinal-direction laser whereby significant laser emission useful for practical purposes is obtained. The invention is characterized by the feature that when laser emission is produced, the active region within the crystal (i.e., the region penetrated by the electron beam) is less deep than the crystal thickness in the direction normal to the opposing crystal faces. Moreover, we have found that the beam diameter is, as a practical matter, only limited by the maximum beam current density which can be produced and in one embodiment of our invention, have employed a bombarding beam of about 800 microns maximum diameter; crystals with a thickness well in excess of 100 microns have also been employed.

Briefly, the device of the present invention comprises a light-resonant cavity having a pair of spaced, opposing, reflective surfaces forming the cavity. The cavity includes a direct band-gap semiconductor crystal having a power conversion efficiency exceeding $10^{-2}$ percent and a pair of spaced, opposing, smooth faces. Each of the cavity reflective surfaces is oriented normal to an axis along the direction which electromagnetic radiation emitted from the adjacent crystal face would travel. A source of electrons for impinging an electron beam on a crystal face for a dwell time not greater than about 1 micro-second as described in more detail hereinafter is included. The beam has sufficient energy to penetrate into the crystal a distance of at least 1 micron. The threshold beam current density increases and decreases monotonically as the product of the reflectivities of the cavity reflective surfaces decreases and increases respectively but increases and decreases monotonically as the beam maximum transverse dimension at the crystal face increases and decreases respectively. As used herein, monotonically means that the derivative of the variables always has the same sign. When a beam of electrons of at least a predetermined energy and current density is impinged upon one of the crystal faces, laser emission produced within the crystal is emitted from at least one of the crystal faces in a direction generally longitudinal to the direction of the beam of electrons.

The electron beam required for producing laser action from a direct band-gap semiconductor can be predetermined to have an energy of from between about 20 Kev to 250 Kev, the upper limit being determined by the energy at which the beam causes radiation damage to the crystal, and to have a current density of at least 0.01 amps/cm². Surprisingly, the beam need not penetrate through the crystal; and, the maximum transverse dimension of the beam, the beam diameter for a beam of circular cross-section, need not be 100 microns or less, but can be as large as can be obtained. Hereafter, the beam cross-section shall be assumed to be circular. The beam diameter apparently is essentially unlimited provided a beam of sufficient current density is employed, i.e., provided the current density is sufficiently great. The beam current density appears to be related to the maximum diameter by:

$$J = J_{th} + K \tag{1}$$

where the term $J_{th}$ is given by:

$$J_{th} = [3E_x/VB\,Y\,(g,D)]\,[\ln(1/R_1R_2)/2 + L\alpha o] \tag{2}$$

The maximum diameter, $D$, is the diameter of the measured area of fluorescence of a crystal when the beam is impinged upon the crystal in a manner as described in greater detail hereinafter. The remaining terms of equations (1) and (2) will be defined later. The basis underlying the equations will now be illustrated with the aid of an idealized hypothetical model which assumes an infinitely thick and infinitely wide crystal, and further assumes that the crystal face which is bombarded by the beam is completely non-reflecting. In such a crystal a photon generated in the crystal would never be reflected. Assume that the direction of travel of each photon generated within the crystal is in either one or the other of two directions, one direction being a direction in a plane parallel to the bombarded crystal face but normal to a beam impinging normal to the face (a "transverse" direction), the other being a direction normal to the bombarded face, (a "longitudinal" direction). If an angular degree is assumed to be "a direction," then for the assumed hypothetical model there are actually 360 transverse directions but only one longitudinal direction.

The process by which a photon is created may be considered as a two step process, the first step involving a transfer of energy to an electron of the crystal to create an electron hole pair, the second step involving the recombination of the electron hole pair. During recombination, one or more photons are given off. For purposes of this model, a photon directly produced by an electron from the electron beam source shall be referred to as a "primary" photon and a photon directly produced by another photon by stimulated emission shall be referred to as a "secondary" photon. It will be appreciated by one skilled in the art that the direction of a primary photon is completely independent of the direction of the electron which produced it but that the direction of a secondary photon is identical to the direction of the photon which produced it. Because there are many more transverse than longitudinal directions, (in the idealized model, 360 transverse directions and only one longitudinal direction) it can well be appreciated why some skilled in the art have doubted that longitudinal-direction laser action could ever be achieved. Moreover, the probability that a primary photon will create a secondary photon is a direct, exponential, function of the length of the "active" region in the direction of the primary photon. On an average each primary transverse photon is capable of creating $e^{gD}$ secondary photons and each primary longitudinal photon is capable of creating $e^{gl}$ secondary photons, thus if it is assumed that for a particular set of beam parameters at threshold (the onset of laser action) a maximum concentration of electron hole pairs is reached, it is understandable why some workers skilled in the art through the beam diameter, $D$, must be at the very least limited to some maximum size. (In the foregoing, $e$ is the base of the natural logarithm, $g$ is the gain coefficient of the crystal and $D$ and $l$ are, respectively the lengths of the transverse and longitudinal active regions — approximately the beam diameter and penetration depths respectively).

We have, however, constructed and operated a longitudinal-direction laser using a beam having a maximum transverse dimension of about 800 microns and now believe that the beam size is only limited by the current density available from the electron gun.

The terms of equations (1) and (2) are as follows:
$J_{th}$ is the threshold current density
$E_x$ is the band-gap energy
$V$ is the electron accelerating voltage
$R_1R_2$ is the product of the cavity reflective surface reflectivities
$\alpha_o$ is the absorption coefficient of the crystal in the "passive" region
$L$ is the crystal thickness
$D$ is the maximum beam diameter, i.e., the length of the transverse active region, and
$g$ is the gain of the crystal given by:

$$g = (1/2l)\ln(1/R_1R_2) + (L_p\alpha_o)/l\,,$$

where
$l$ is the penetration depth or length of the longitudinal direction active region,
$L_p$ is the length of the longitudinal direction passive region given by:

$$L_p = L - l,$$

$B$ is a material constant given by:

$$B = (g + \alpha_o)/n$$

$n$ is the number per cubic centimeter of electron hole pairs in the active region,
$Y_o$ is the time after its creation that an electron hole is annihilated and a primary photon is created
$Y(g,D)$ is the effective time it takes to create a secondary photon given by:

$$\frac{1}{Y(g,D)} \cong \left(\frac{1}{T_o}\right)\left\{1 - \frac{l}{D} + \frac{4l}{D\pi(gD)^2}\int_0^\pi [(gD\sin\theta - 1)(e^{gD\sin\theta}) + 1]d\theta\right\}$$

Limiting approximations for $Y(g,D)$ are $$\frac{1}{Y(g,D)} = \begin{cases} \dfrac{1}{T_o} & , gD \ll 1 \\ \left(\dfrac{1}{T_o}\right)\left(\dfrac{2le^{gD}}{\sqrt{2\pi}\,D(gD)^{3/2}}\right) & , gD \gg 1 \end{cases}$$

$K$ is the additional amount of current density above the threshold current density, $J_{th}$, required to obtain the desired output intensity, and ln is the natural logarithm.

In the foregoing derivations, the simplifying assumption was made that the current distribution over the beam cross-section was uniform. That is, that the beam "profile" (a curve of current density plotted as a function of position across the beam cross-section) has a rectangular shape. It is well known, however, that the profile of ordinary electron guns is a gaussian function sometimes referred to as a bell shaped curve.

Typical values of parameters of equation (2) for "semi-transparent" materials are:

$Y_o = 3.5 \ 10^{-9}$ sec
$\alpha_o = 10 cm^{-1}$
$B = 10^{-15} cm^2$
$E_x = 4.8 \times 10^{-19}$ Joules
$V = 50$ KEV
$R_1 R_2 = 0.9$
$l = 5 \times 10^{-4}$ cm
$L = 10^{-2}$ cm For $D = 10^{-2}$ cm, $J_{th} = 1.2$ amps/cm$^2$ and for $D = 10^{-1}$ cm, $J_{th} = 3.5$ amps/cm$^2$ It will be appreciated by those skilled in the art that the electron beam may impinge on a crystal face at an angle other than the normal to the surface; emission normal to the face would then only be generally longitudinal to the impinging beam. The penetration depth required depends upon the transparency of the crystal to light of its characteristic wavelength as well the crystal thickness and beam current density and diameter. A 50 Kev beam would penetrate about 5 microns into a crystal. Semi-transparent crystals, crystals which are nearly transparent at the wavelength of their characteristic emission, include crystals of the sulfides, selenides, tellurides, and oxides of cadmium and zinc. For a beam of 10 amps/cm$^2$, 800 microns maximum diameter, and 50 Kev the total cavity thickness of such a semi-transparent crystal can be at least 100 microns. The "passive" region of such a crystal is thus about 95 microns while the "active" region (penetration depth) is about 5 microns. For current densities obtainable with commercially available electron guns, such crystals should not be more than 1,000 microns thick, otherwise absorption losses in the passive region become so great as to preclude production of laser emission from the crystal. For crystals not so transparent to light of their characteristic emission, "semiopaque" materials, such as the compounds and solid solutions of the sulfides, selenides and tellurides of lead and the compounds and solid solutions comprising at least one of the elements of indium and gallium with at least one of the elements of antimony and arsenic, passive regions on the order of twice the beam penetration depth are acceptable. The other boundary of the active region corresponds to the cross-section of the beam at the crystal face on which the beam impinges. The dimensions of this boundary, and the corresponding beam dimensions, shall hereafter be referred to as the "transverse" dimensions; the gain experienced by a photon traveling from one to another extreme of the active region transverse dimension of maximum length shall hereafter be referred to as the "transverse single-pass gain;" and, the gain experienced by a photon in one pass through the longitudinal dimension of the active region (i.e., the dimension of the active region which runs between the crystal faces, normally the penetration depth of the electrons) shall hereafter be referred to as the "longitudinal single-pass gain."

It is well known that if an electron beam dwells on a light resonant cavity too long the crystal or the cavity reflective surface can be damaged by the heat generated by the beam. By dwell time it is meant the duration of a pulsed electron beam, or the quotient of the beam diameter divided by the beam sweep rate of a scanned electron beam laser. Surprisingly, we have found that the sweep rate of a beam is critical. Apparently because of the non-uniform distribution of the current density of a beam, it has been necessary to sweep a beam (which produced laser action when pulsed but not scanned) at a relatively high speed. The emission from a longitudinal direction laser need not be continuous, as we have found that the beam dwell time can be sufficiently long to quench the laser emission even though it is not long enough to produce heat damage.

In one embodiment of our invention means are provided for scanning about a 50 μ diameter, 50 Kev beam at a rate of about $3 \times 10^4$ cm/sec on a CdS platelet to produce a two-dimensionally scanned, longitudinal direction laser.

One skilled in the art will appreciate that a direct band-gap semiconductor is one whose minimum energy in the conduction band lies at nearly the same position in the Brillouin zone (at nearly the same point in $k$ space) as its maximum energy in the valence band. Examples of known direct band-gap semiconductor crystals are the compounds and solid solutions of the sulfides, selenides, oxides and tellurides of cadmium and zinc, the compounds and solid solutions of the sulfides, selenides and tellurides of lead, and the compounds and solid solutions comprising at least one of the elements of indium and gallium with at least one of the elements of antimony and arsenic.

The crystal may be a vapor grown platelet, a wafer cut from a bulk crystal, or an epitaxial film on a substrate. Acceptable platelets have been grown by a vapor phase deposition process such as that described in the article "Vapor Phase Crystallization of Cadmium Sulfide Crystals," J. Chem. Physics 24, page 1279 (1956) using a commercial grade sintered powder. Suitable epitaxial films are described in co-pending U.S. applications Ser. No. 829,450, filed Aug. 12, 1969 and Ser. No. 849,450, filed Dec. 23, 1969, both of which are assigned to the same assignee as the present invention. Acceptable wafers have been produced from bulk crystals grown by vapor techniques using sintered powder, also of commercial grade. A method suitable for polishing a wafer cut from a bulk crystal is described in co-pending U.S. application Ser. No. 803,805, filed Mar. 3, 1969 which application is assigned to the same assignee as the present application. As previously, explained, for present state of the art electron beam sources, the opposing faces of a crystal should preferably be separated by not more than about 1,000 microns.

In one embodiment of the invention, the crystal faces are plano-parallel and the reflective surfaces of the light-resonant cavity are coatings of silver on the crystal faces. Alternatively, the reflective surfaces may comprise discrete reflectors spaced from the crystal faces. When discrete reflectors are employed, if the crystal faces are not plano-parallel, each reflector is oriented at an angle to be normal to an axis along the direction travelled by electromagnetic radiation emitted from the crystal face adjacent the reflector.

Conveniently the coating of silver may be deposited on the crystal faces by well known vacuum evaporation techniques to a thickness sufficient to provide the desired reflectivity to light having a wavelength the same as the wavelength of the crystal characteristic emission. Alternatively, the reflectors may be dielectric mirrors. As is well known, the characteristic emission wavelength, $\lambda$, of a crystal is related to the crystal band-gap energy by the equation $$\lambda \cong ch/E_x \qquad (3)$$

wherein $c$ is equal to the velocity of light in vacuum, $h$ is equal to Planck's constant and $E_x$ is about equal to the crystal band-gap energy.

If the crystal faces are to form the reflective surfaces, conventional interferrometric techniques may be employed to select a crystal of sufficient parallelity. For a 100 micron thick crystal, the crystal faces should be parallel to within 10 milliradiams, thicker crystals require faces which are more parallel but for thinner crystals the faces need not be as parallel. It will, of course, be appreciated that when it is said that the faces are parallel to within so many radians, it is meant that there are not more than that many radians in any acute angle formed by the intersection of the planes of the two faces. It should be recognized that when reference is made to "the planes" of the opposing faces, it is not meant to be implied that all portions of each face lie within the same plane, i.e., that each face has only a single plane. For example, platelets operative in the devices of the present invention can have terrace or step-like faces and therefore have a number of opposing face segments. Instead of just having a single pair of planes, a platelet therefore has a number of pairs of planes. The conditions or properties which are herein attributed to or specified for "the planes" of the faces are meant to apply to each pair of planes of a crystal.

One way insure the absence of a "cavity" along each transverse direction, if the edge of the crystal, i.e., the crystal surface between the crystal faces, has no optically smooth areas of appreciable size. For semi-opaque crystals which have faces slightly larger, and for transparent crystals whose faces are many times larger, than the beam diameter, a cavity may exist along one or more transverse directions provided the transverse direction is sufficiently larger than the beam diameter that, at threshold for the longitudinal direction, the product of the transverse single-pass gain and the transverse losses in each such transverse direction of the crystal is less than one. Expressed in equation form, the requirement is:

$$e^{gD} e^{-\alpha_0} L_p \sqrt{R_1 R_2} < 1 \qquad (4)$$

where the terms are as previously defined, except that $L_p$, $R_1$ and $R_2$ are for the transverse direction.

It has been determined that the power conversion efficiency of a crystal should exceed about $10^{-2}$ percent as measured in the spontaneous region as hereinafter defined. The term "power conversion efficiency" when used herein is meant to be the ratio between substantially all the electromagnetic power emitted from a crystal face and the power of energy incident upon the same face. It is believed, that the power conversion efficiency is a second order effect which indicates whether the concentration of imperfections in a crystal is acceptably low. As used herein, the term "imperfections" encompasses both native defects (vacancies, interstitials, and dislocations) and foreign defects (impurities, i.e., elements other than the constituent elements). Further, "interacting" imperfections are those which exert a negative influence on generation of laser emission if present in excessive concentrations. "Neutral" imperfections are those which apparently neither markedly detract from nor aid the laser mechanism.

For II-VI compound materials such as CdS, we have generally found that the materials which have high intrinsic perfection and purity make the efficient lasers. We have found, however, that donor impurities (Ga and Cl) and/or acceptor impurities (Cu and P) apparently are interacting imperfections, but can be present in concentrations of the order of 10 ppm. We have also found that Si is a neutral imperfection and can be present in concentrations up to 50 ppm. We have also found that when the total concentration of interacting impurities increases an order of magnitude, to the level of 100 ppm., the efficiency of the laser crystal is strongly reduced.

It will also be appreciated that the foregoing description has been with reference to an oscillating laser, i.e., one in which photons are reflected between reflective surfaces of a resonant cavity, generating additional photons on each pass through the active region. A laser can be constructed in which no reflectors are required, provided the current density is sufficiently high and, preferably, the beam diameter is not more than about twice the penetration depth. An anti-reflector may even be employed, if desired, adjacent the face of the crystal from which the laser emission is to exit. A reflector can be employed adjacent a face from which no or only little emission is to exit. Such a laser is a "non-oscillating" laser, and requires that the device have a sufficiently large longitudinal single-pass gain to create a useful number of photons in the longitudinal direction.

DESCRIPTION OF THE PREFERRED EMBODIMENTS

In one embodiment of the present invention, a semiconductor platelet comprising a II–VI compound was utilized. The II–VI compound was a naturally grown $CdS_xSe_{(1-x)}$ single crystal platelet having about 0.2 percent zinc and a low surface strain in terms of surface dislocations, the absence of a destruction layer and the like.

Such $CdS_xSe_{(1-x)}$ single crystal platelets can be grown utilizing known vapor growing techniques in a furnace in an atmosphere of inert gas at elevated temperatures. The $CdS_xSe_{(1-x)}$ platelet grows naturally from a surface or face of a $CdS_xSe_{(1-x)}$ crystal. In one experiment, a $CdS_xSe_{(1-x)}$ crystal was utilized wherein $x$ was approximately 0.3

Selection of a naturally grown crystal avoids the disadvantage of requiring fabrication by cleaving crystal platelets or preparing crystals cut from bulk crystals by mechanical or chemical polishing techniques. However, it is anticipated that a fabricated crystal can be prepared to utilize the teachings of this invention. Further, it is contemplated that the single crystal platelet can be in the form of a crystalline film grown or deposited on a substrate. Such crystalline films can have relatively larger lateral dimensions and smaller thicknesses than those of a freely grown single crystal platelet because of the mechanical strength afforded by the substrate to the crystal or crystallites formed thereon. Additionally, it is contemplated that a crystal wafer can be fabricated into a different geometry wherein the $c$-axis is not orientated in the plane of the platelet.

Figure 1:
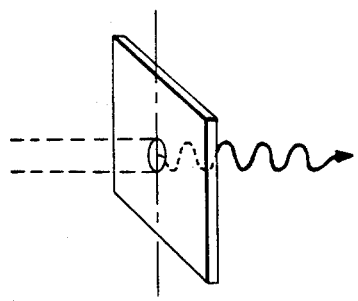
FIG. 1 is an illustration of a single $CdS_xSe_{(1-x)}$ crystal having vapor coated silver reflective surfaces thereon.

An example of a naturally grown single crystal platelet is a $CdS_xSe_{(1-x)}$ platelet which is generally rectangular in shape, although it can have other shapes. In FIG. 1, a naturally grown $CdS_xSe_{(1-x)}$ single crystal platelet 10 has two natural, relatively large, substantially planar, smooth faces 12 and 14. In this particular embodiment, the platelet is relatively thin and it is preferred to have faces 12 and 14 parallel. These faces are shown in FIG. 1 as planar; they need not be. The faces 12 and 14 as shown are substantially parallel to each other and contain the $c$-axis of the crystal platelet 10. The faces 12 and 14 form two reflective surfaces of a light-resonant cavity. Additionally, the platelet 10 has two natural ends 16 and 18 and at least two edges 20 and 22. The ends 16 and 18 and the edges 20 and 22 should be irregular crystal surfaces. Since neither the ends 16 and 18 nor the edges 20 and 22 are critical to the cavity dimension, the faces 12 and 14 may be any desired length or width.

The naturally grown crystal platelets need not be further fabricated to form a resonant cavity. The smooth planar faces 12 and 14 which are perpendicular to and extend between the ends 16 and 18 and edges 20 and 22 form the reflective surfaces of the cavity. The cavity dimension is then determined by the thickness of the crystal. The reflective faces 12 and 14 which form the reflecting surfaces of the cavity were vapor coated with silver. Face 12 is vapor coated to less than one per cent transmitting or about 95 percent reflecting while face 14 is vapor coated to about 8 per cent transmitting or about 90 percent reflecting.

In one experiment, the platelet had a thickness in the order of about 50 microns, a length along its $c$-axis of about 5 millimeters, and a width in the order of about 1 millimeter. The electron beam penetrated into the cavity, at one of the reflective faces, in the order of 5 to 10 microns. The attenuation of radiation in the region of 40 to 45 microns of the crystal cavity not penetrated by the electron beam must be less than that necessary to destroy the resonance in the cavity. When the cavity dimension exceeds the penetration depth of the electrons, low attenuation of radiation within the unpenetrated region can be explained by a phonon assisted transition, or by saturation of the absorption transition, or by a transition wherein the terminal state is also an excited state of the crystal. Obviously, this attenuation may alternatively be reduced by making the cavity dimension thinner. In this experiment, laser emission in the transverse direction was not observed, since the attenuation of radiation in that direction was higher because of longer path length, higher diffraction losses, cavity misalignment in that direction, and low reflectivity at unsilvered roughened and nonparallel edges and sides.

The $CdS_xSe_{(1-x)}$ platelets utilized in the examples herein were selected to have a power conversion efficiency which was at least sufficient to permit stimulated emission when the platelet was bombarded by an electron beam of a predetermined voltage and current density. The term "power conversion efficiency" when used herein is meant to be the ratio between substantially all the electromagnetic power output emitted from the unsilvered cavity surface bombarded by the electron beam and the power provided by he source of energy incident upon the platelet. A power conversion efficiency exceeding about $10^{-2}$ percent as measured in the spontaneous emission region for an unsilvered cavity was necessary for the crystal to produce stimulated emission. It will be appreciated by those skilled in the art that the electromagnetic radiation produced within a crystal in response to energy incident thereupon conveniently divides crystal operation into three regions; namely, a region wherein the radiation is attributable to spontaneous emission, the crystal spontaneous emission region, a region wherein the radiation is attributable to both spontaneous and stimulated emission, the crystal super-radiant region, and a region wherein the radiation is produced almost solely by stimulated emission, the mode oscillation region. Hereafter, the incident intensity energy marking the boundary between the spontaneous and superradiant region shall be referred to as the "pre-determined" intensity and the energy at the boundary between the superradiant region and the mode oscillation regions shall be referred to as the "threshold" intensity.

Figure 2:
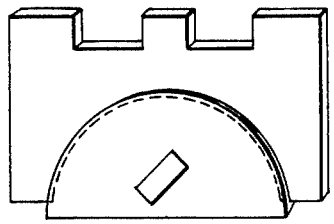
FIG. 2 is a diagrammatic representation of a $CdS_xSe_{(1-x)}$ crystal mounted on a tab mounting device in preparation for bombardment by an electron beam.

Referring now to FIG. 2, the $CdS_xSe_{(1-x)}$ crystal in one experiment was mounted in a tab mounting device generally designated as 30. The tab mounting device 30 is made of copper having outside dimensions of a length of about 2.5 centimeters, a width of about 1 centimeter and a thickness of about 1 millimeter. The tab mounting device 30 had two slots 32 and 34 cut therein to permit a removable mounting of the device into a cryostat tail section of the apparatus of FIG. 3. A semicircular sector 38 having a diameter of about 1 centimeter is cut into the tab mounting device 30 on the edge opposite the slots 32 and 34. A semicircular carrier 40 having a diameter which is slightly greater than that of the sector 38 is mounted over the sector 38 by means of an adhesive formed from vacuum grease and copper powder. In one experiment, a conductive coated sapphire carrier was used. However, the carrier 40 may be some other electrically conductive or conductively coated material which provides mechanical support for the crystal, which is transparent to the wavelength of the emitted electromagnetic radiation, and which is capable of thermally conducting heat from the crystal. Crystal 10 is mounted approximately in the center of the carrier 40 by means of adhesive such as vacuum grease or a suitable adhesive. The crystal 10 is mounted on the carrier 40 such that the face having the least amount of silver coating is in contact via the adhesive with the carrier 40. In FIG. 2, the crystal 10 is illustrated with face 12 being spaced from the carrier 40 whereas face 14 is adjacent carrier 40. The electron beam is positioned to bombard face 12 and the resulting electromagnetic radiation is transmitted out of face 14 through carrier 40.

Figure 3:
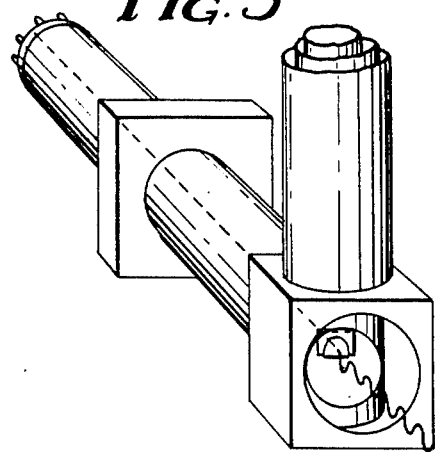
FIG. 3 is a diagrammatic representation of apparatus for producing coherent electromagnetic radiation in the NEF direction by stimulated emission of a $CdS_xSe_{(1-x)}$ crystal with an electron beam.

FIG. 3 illustrates apparatus which may be used for producing laser emission from a semiconductor platelet. Briefly, the laser apparatus comprises a cryostat tail section 50 containing a liquid refrigerant such as the liquid nitrogen which is ultimately used as the means for cooling the $CdS_xSe_{(1-x)}$ platelet to a predetermined ambient temperature. The cryostat tail section 50 may be, for example, an optical access tail section for a standard helium cryostat.

A rectangular block housing member 52, which is about 5 centimeters on each side and constructed of nonmagnetic stainless steel, has a hollowed-out interior. The member 52 has an opening in one side which receives the cryostat tail section 50. Inside the interior of member 52, the tail section 50 terminates in a cold finger to which is attached the tab mounting device 30 which supports the platelet 10 as described. The member 52 has, on an adjacent side 56, a quartz window 58 which is about 2.5 centimeters in diameter. The quartz window 58 allows the radiation from platelet 10 to exit from the member 52.

When the platelet 10 is excited into stimulated emission, the electromagnetic radiation, illustrated as arrow 60, is emitted from the reflective face 14 of platelet 10, and out of member 52 via the quartz window 58. The radiation 60 is detected by means of a photodetector (not shown) such as an RCA type 922.

Means for generating an energy beam such as an electron gun 62 is secured to the block housing member 52 on a side 64, which side is directly opposite to and in alignment with the side 56 containing the quartz window 58. The electron gun 62 may be, for example, an RCA electron gun type VC2126. The electron gun 62 includes a thoriated tungsten directly-heated cathode. Appropriate grids are used for modulating, focusing and accelerating the electron beam 80 onto the face 12 of platelet 10. A means for deflecting and scanning the electron beam, such as a deflection coil 82, is positioned about an electron gun housing 84 in axial alignment with the electron beam 80. In one embodiment, the electron beam had a potential of about 50 KV and a current density ranging up to 10 amps/cm$^2$ and greater with a beam cross-section of about 300 microns in diameter. The beam current profile in this and the following embodiments included a central cross-section about 300 microns in diameter in which about one-third of the total beam current was concentrated. This was determined by measuring the total current through a 300 micron diameter hole in a metallic mask. This profile was obtained by placing a first focusing coil (SYNTRONIC type 720 A) around the housing 84 between deflection coil 82 and block housing member 52 but as close to the block housing member as possible. A second focusing coil (CELCO type F-33A) was placed around housing 84 on the other side of deflection coil 82. The maximum diameter of the beam having this profile was about 800 microns in diameter. The maximum diameter was determined by bombarding a natural (not silvered or "mirrored") surface of a CdS platelet. A measuring microscope was employed to measure the diameter of the fluorescent spot produced by the beam.

In this embodiment, the c-axis of the $CdS_xSe_{(1-x)}$ platelet is in the plane of the platelet and perpendicular to the electron beam 80 and radiation is produced in the longitudinal direction as shown. The electric field vector associated with the electromagnetic radiation appears to be in a direction perpendicular to the c-axis of the platelet.

Figure 4:
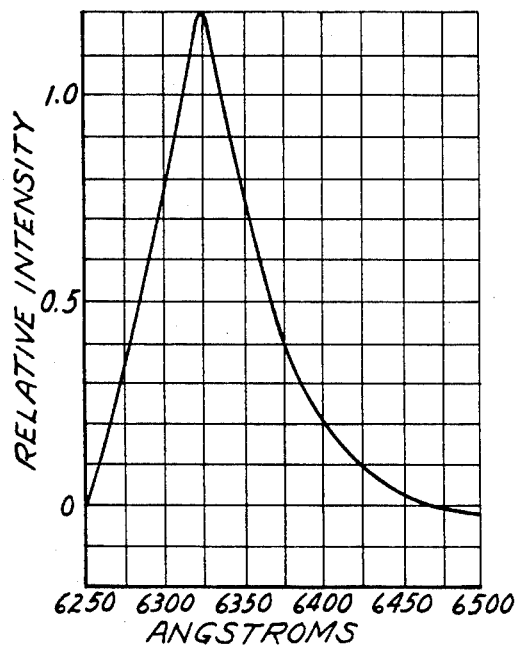
FIGS. 4 and 5 are graphic representations of the emission spectrum of electromagnetic radiation from a $CdS_xSe_{(1-x)}$ single crystal in the NEF direction at a temperature of about 77° K, below and above threshold respectively.
Figure 5:
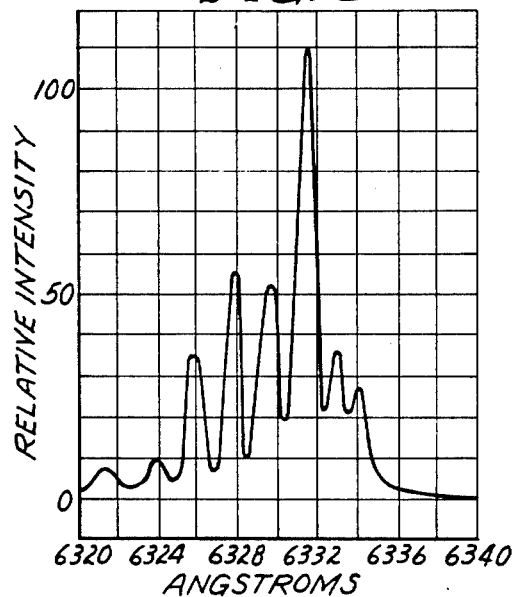

Referring now to FIGS. 4 and 5, the graphs illustrate in a waveform the output emission intensity from a $CdS_xSe_{(1-x)}$ platelet, wherein $x$ approximately equals 0.3, versus wavelength below and above threshold for stimulated emission. The faces 12 and 14 of platelet 10 form a Fabry-Perot cavity having a cavity dimension of about 50 microns, which also is the platelet thickness. The resulting emission from the crystal during stimulated emission is in the red portion of the spectrum at about 6,320 A to about 6,340 A when the crystal is cooled to about 77° K.

The $CdS_xSe_{(1-x)}$ platelet was cooled to a temperature of a about 77° K, near the temperature of liquid nitrogen, and bombarded with a pulsed electron beam. The electron beam had a voltage of about 50 KV and a current density of about 10 amps/cm$^2$. The pumping pulses had a duration of about one-tenth of a micro-second. The output intensity from the platelet 10 was found to be at a maximum at about 6,331 A.

When the electron beam current was below threshold, or less than about 4 amps/cm$^2$, and upon sweeping the output intensity with a spectrometer grating, an emission line having a maximum output intensity was found to occur at about 6,320 A over a bandwidth between 6,250 A and 6,480 A or about 250 A. The half width of the emission line near 6,320 A was about 65 A. FIG. 4 illustrates the emission spectrum of the $CdS_xSe_{(1-x)}$ platelet at a temperature of about 77° K when the crystal is pumped by an electron beam having a current which is below the 4 amps/cm$^2$ needed to cause stimulated emission.

When the electron beam current was increased to exceed 5 amps/cm$^2$, say up to about 10 amps/cm$^2$, and upon sweeping the output intensity in the same manner as described, the output intensity was found to peak at about 6,331 A. Both above and below threshold modulation of electron beam resulted in corresponding modulation of the emitted radiation. The emission line of the radiation peaked at a higher maximum output intensity, for example relative intensity of about 100 above threshold versus a relative intensity of about 1 below threshold. The emission line exhibited line narrowing wherein the half width of the highest intensity emission line was found to be less than 0.5 A and possibly narrower. When the electron beam was directed onto other parts of the crystal, coherent radiation was emitted from these parts, illustrating scanability.

FIG. 5 illustrates the emission spectrum emitted from the same $CdS_xSe_{(1-x)}$ platelet excited by an electron beam having a current which is sufficient to cause stimulated emission. The characteristic structure in the spectrum corresponds to the mode oscillations appropriate to the resonant cavity.

The peak or average wavelength appears to occur experimentally around 6,331 A with a measured spacing between modes or a $\Delta\lambda$ of about 2 A.

The theoretical spacing between modes can be calculated by the following equation:

$$\Delta\lambda = \lambda^2/2d[n-\lambda\, dn]/d\lambda$$

wherein:
$\lambda$ = average wavelength,
$d$ = cavity dimension,
$n$ = index of refraction for semiconductor,
$dn/d\lambda$ = change in index of refraction per unit change in wavelength for the semiconductor at $\lambda$.

The $\lambda$, in the above sample, was 6,331 A and $d$ equalled 50 $\mu$. Using reasonable values of $n$ equals 2.8, and $dn/d\lambda$ equals $-2 \times 10^{-3}$ A$^{-1}$, this equation when solved using the above values yields a $\Delta\lambda$ of 2.5 A, which is in good agreement with the experimental $\Delta\lambda$ of 2 A.

The electromagnetic radiation emanating from this laser apparatus under conditions of stimulated emission is both temporally coherent, which describes the monochromatic nature of the emitted light, and spatially coherent, which describes the tendency of the emergent light to undergo little divergence.

Figure 6:
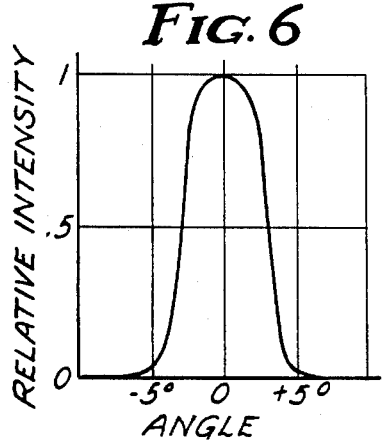
FIG. 6 is a diagrammatic representation of the relative intensity of the electromagnetic radiation as a function of an angle showing directionality of the electromagnetic radiation in the plane defined by the c-axis and the normal to the platelet.

FIG. 6 is a graphic representation of the light intensity as a function of angle in the plane defined by the $c$-axis and the normal to the platelet. This representation was made by taking a picture of the visible light emanating from the platelet 10 about 3 centimeters from the quartz window 58 and plotting the exposure on the photograph along a traverse across the image. The resulting curve, as expected, clearly demonstrates directionality associated with coherent light.

Figure 7:
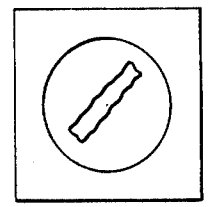
FIG. 7 is diagrammatic representation of the electromagnetic radiation emanating from the single $CdS_xSe_{(1-x)}$ crystal passing through the window of the apparatus in FIG. 3.

FIG. 7 is a diagrammatic representation of the photograph of the visible light emanating from the platelet through the window 58 and from which the graph of FIG. 6 was obtained.

In each of the following embodiments the beam was pulsed at a repetition rate of 60 pulses per second. The pulses had a duration of about one-tenth of a microsecond and the beam potential was about 45 Kev. Except where noted the current density was about 10 amps/cm². The results reported for each of the following embodiments, except where noted, were for a temperature of about 77° K.

In one embodiment a CdSe triangular shaped platelet about 2mm on a side and about 5 $\mu$ thick was interferrometrically determined (using infra-red (8,000A) light and infra-red film) to have faces parallel to within 0.05 milliradians. The crystal faces were coated with silver, one face approximately 2,000 A and the other about 500 A thick. When bombarded, the diameter of the "emission spot" (the diameter of the laser emission 1 inch from the crystal face) was one-half inch. The emission output was measured to be 1.5 watts. Spectrographic analysis of the crystal showed the following impurity concentration:

Si<5 ppm
Cu, Fe and other interacting impurities <1 ppm as measured by emission spectroyraphic analysis.

In a further embodiment a ZnO wafer cut from a bulk crystal and polished to a thickness of 50 microns was interferrometrically determined using Mercury light (5,460 A) to have faces parallel to within 0.1 milliradians. The face on which the beam was to be impinged was coated with 1,550 A of silver and the other face was coated with 575 A of silver. When bombarded the threshold current density marking the boundary between the super-radiant and mode oscillation regions was about 2.2 amps/cm². The output was measured to be 28 watts maximum. For the same conditions except a temperature of about 300°, the threshold current density was about 10 amps/cm² and the output was about 0.2 watts.

In another embodiment a wedge shaped CdS platelet having faces about 2mm by 4mm and about 45 microns thick at the thick edge, tapering to about 19 microns at the thin edge was employed. One face of the crystal was coated with about 1,550 A of silver, a dielectric mirror adjacent the other crystal face was interferrometrically aligned with the silver coated face of the crystal so that the spacing between the interference fringes of the dielectric mirror and silver coated face was maximum. This resulted in an angle between the dielectric mirror and the adjacent crystal face of nearly 35.00 milliradians. When bombarded at current densities somewhat less than 10A/cm², laser emission occurred as evidenced by the sudden onset of an emission spot. The emission spot diameter was about one-sixteenth of an inch. Laser emission was similarly observed at 300 °K.

In yet another embodiment, a ZnO wafer cut from a bulk crystal and polished to a thickness of 305 microns was interferrometrically determined using Mercury light (5,460 A) to have faces parallel to within about 0.1 milliradians. The face on which the beam was to be impinged was coated with 1,550 A of silver and the other face was coated with 525 A of silver. When bombarded a peak emission output of 1.5 watts was measured. Laser emission from such a cavity length (305 microns) is more directional than from a shorter cavity. In this case, the emission spot diameter was about $39 \times 10^{-3}$ inches.

An electron beam laser has wide utility. For example, the coherent electromagnetic radiation produced by the laser can be utilized as an optical scanning device or as a means for transmitting graphic or pictorial information in the form of a modulated electromagnetic radiation. Such applications are merely exemplary and are not intended to limit the broad scope of this invention.

One example of an optical scanning device is a color television. Typically, color television devices include an electron gun for each color (usually, although not necessarily, three in number) of the device. A received television signal includes a set of signals for each of the electron guns, each set of signals being applied to a gun to modulate the intensity of the electron beam produced by the gun. In a color television according to the present invention, a laser device as hereto fore described is substituted for each electron gun and a viewing screen is provided upon which the emission from the laser devices impinges to provide a colored image.

Another example of an optical scanning device is a device for recording an image on light sensitive film, such a dry silver film. In one such device, the image to be recorded is optically scanned to convert the image into a series of electrical signals. The electrical signals are applied to a source of electromagnetic radiation such as an electron gun, as the gun output is scanned across the recording film. The film development/exposure is thus controlled by the series of electric signals to varying degrees in accordance with the optical characteristics of the image being recorded. In the image recorder of the present invention, the electron beam gun is replaced with a laser device whose crystal has a characteristic wavelength matched to the wavelength of maximum sensitivity of the recording media.

Having thus described a preferred embodiment of an electron beam laser, it is understood that modifications thereof are apparent to one having ordinary skill in the art and all such modifications and equivalents thereof are contemplated as being within the scope of the appended claims.

What is claimed is:

1. A device for producing electromagnetic radiation by stimulated emission from a light resonant cavity including a semiconductor crystal, comprising a light resonant cavity including a direct band-gap semiconductor crystal having a pair of major broad optically smooth opposing parallel surfaces;

means for providing almost totally reflective surfaces parallel to each major broad crystal surface for defining said cavity, with one reflective surface being more reflective than the other; and means for exciting said crystal into stimulated emission by directing at one of said major broad surfaces an electron beam having sufficient energy to create in said crystal, an active region excited into a state of stimulated emission corresponding to the penetration region of the electron beam, to cause coherent electromagnetic radiation to be emitted from said cavity through the least reflective of the reflective surfaces in a direction which is substantially normal to the major broad crystal surfaces;

characterized by the feature that when said coherent electromagnetic radiation is emitted, the active region depth is less than the crystal thickness in the direction normal to the parallel surfaces.

2. A device according to claim 1, wherein the energy of the electron beam is 50 keV.

3. A device according to claim 1 wherein the opposing parallel crystal surfaces are spaced 50 microns apart.

4. A device according to claim 3 wherein the energy of the electron beam is 50 keV, and the electron beam has a maximum diameter of 300 microns.

5. A device according to claim 1, further comprising means for scanning the electron beam across said one broad crystal surface.

6. A device according to claim 5, further comprising means for modulating the electron beam.

7. A device according to claim 1, wherein the semiconductor crystal is a vapor grown platelet.

8. A device according to claim 7, wherein the semiconductor crystal is a naturally grown $CdS_xSe_{(1-x)}$ single crystal platelet.

9. A device according to claim 1, wherein the semiconductor crystal is a crystalline film on a substrate.

10. A device according to claim 1, wherein the semiconductor crystal comprises a compound selected from the group comprising selenides, and sulfides of cadmium.

11. A device according to claim 1 wherein the semiconductor crystal is a II–VI compound.

12. A device for producing electromagnetic radiation by stimulated emission from a light resonant cavity consisting of semiconductor crystal, comprising a light resonant cavity consisting of direct band-gap semiconductor crystal having a pair of major broad optically smooth opposing parallel surfaces;

means for providing almost totally reflective surfaces parallel to each major broad crystal surface for defining said cavity, with one reflective surface being more reflective than the other; and means for exciting said cavity into stimulated emission by directing at one of said major broad surfaces an electron beam having sufficient energy to create in the cavity, an active region excited into a state of stimulated emission corresponding to the penetration region of the electron beam, to cause coherent electromagnetic radiation to be emitted from said cavity through the least reflective of the reflective surfaces in a direction which is substantially normal to the major broad crystal surfaces;

characterized by the feature that when said coherent electromagnetic radiation is emitted, the active region depth is less than the cavity thickness in the direction normal to the parallel surfaces.

* * * * *